UNITED STATES PATENT OFFICE.

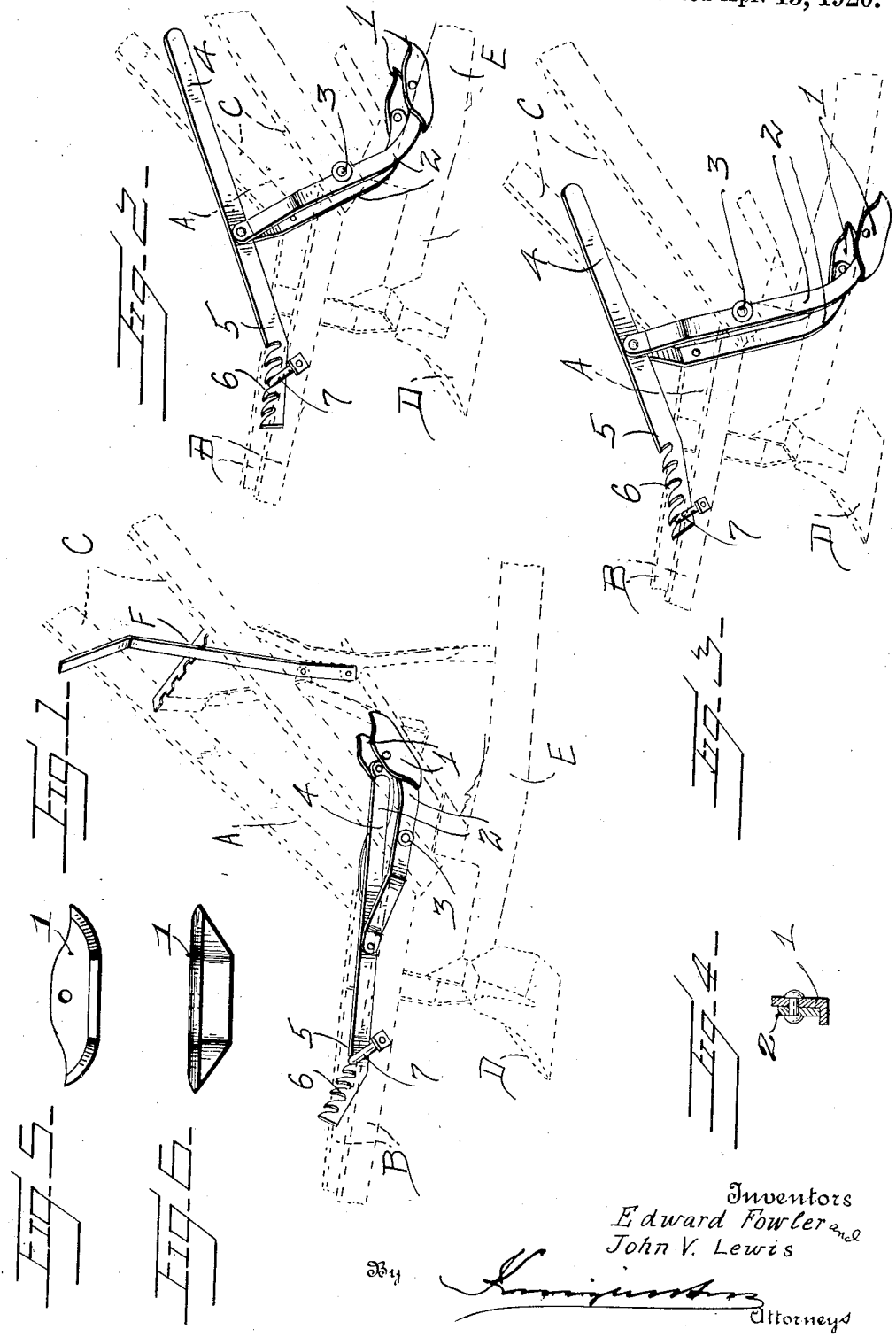

EDWARD FOWLER AND JOHN V. LEWIS, OF ST. ELMO, TENNESSEE.

AGRICULTURAL IMPLEMENT.

1,337,126.  Specification of Letters Patent.  Patented Apr. 13, 1920.

Application filed September 19, 1918. Serial No. 254,732.

*To all whom it may concern:*

Be it known that we, EDWARD FOWLER and JOHN V. LEWIS, both citizens of the United States, residing at St. Elmo, in the county of Hamilton and State of Tennessee, have invented certain new and useful Improvements in Agricultural Implements, of which the following is a specification.

The present invention broadly relates to agricultural implements, but particularly to that class of implements which are used in preparing the soil for planting and in cultivating the soil for inducing growth of vegetation.

The invention will be described in connection with a cultivator. While its use is not limited to cultivators, it is with this class of implement that its advantages are more fully appreciated. Moreover, the invention is more readily adapted to those cultivators which are known in the trade as Fowler implements.

The object of the invention is to provide means whereby the soil manipulating parts of an agricultural implement may be controller to such an extent that the implement may be used without difficulty in any kind of soil. Another object is to provide means whereby a ground working implement may be transported from place to place with ease.

Further objects will appear upon reference to the following description and accompanying drawing.

In said drawing:

Figure 1 is a perspective view showing a cultivator, in dotted lines, with the invention as applied thereto;

Fig. 2 is a perspective view of a portion of a cultivator, illustrating the invention in full lines, but in a different position from that of Fig. 1;

Fig. 3 is a view similar to Fig. 2, illustrating the invention in still another position;

Fig. 4 is a sectional view through one of the skids or shoes;

Figs. 5 and 6 are side elevational and plan views respectively of one of the skids.

Referring to the drawing in detail, A represents a cultivator constructed on the principle of the Fowler type, having the usual shafts or beams B, handles C, furrow opening means or plow-share D, and cultivating blades E. A cultivator of this type may be used either for planting or cultivating purposes. It is desirable to adjust the angle of the blades E to meet certain conditions, and to accomplish this, a rack bar F is employed for either spreading or retracting the ends of the blades E.

As heretofore practised, cultivators are more or less hampered in properly performing their functions in certain kinds of soil, for instance, soft and deep, sandy soil. When used in soil of this kind, the blades of the cultivator, as well as the furrow opener, generally sink too far below the surface of the soil, thus defeating the purpose of the implement. The present invention contemplates overcoming this undesirable condition by providing what may be termed a float, or means for controlling the cutting depth of the furrow opener and the cultivator blades. This float preferably embodies means such as skids 1, which are so constructed and mounted relative to the frame of the cultivator that they may be swung into or out of skidding relation to the soil over which the cultivator traverses, and in this manner regulate the cutting depth of the cultivator blades and the furrow opener. As shown, each of these skids comprises a central flat skidding surface with upturned forward and rearward edges; and a vertical flange which provides a point of attachment. Furthermore, the skids are identical, so that they may be substituted for one or the other, and are symmetrical with respect to a plane which passes transversely through the central attaching point, so that the skidding action is the same whether the movement be forward or backward. The mounting means for these skids 1 preferably comprise a pair of arms 2, pivoted intermediate their ends, as at 3, to the cultivator frame, and fastened to an actuating lever 4 intermediate the ends thereof. The end 5 of this lever is provided with a plurality of teeth or serrations, which are adapted to engage the bar 7, which is carried by the portions B of the frame. Referring to Fig. 1, where the skids 1 are shown in an inoperative position, it is to be noted that the actuating lever 4 is in a horizontal position, and that the last tooth on the end 5 of the lever is in engagement with the bar 7. In Figs. 2 and 3, the skids are shown in operative position. Fig. 2 illustrates them as only a part way in their extended position, and when in this position the blades E of the cultivator would have a tendency to sink or cut more deeply into the soil, but when the skids are in a position as illustrated in Fig. 3, the blades E would traverse only the top of the soil. The cutting action of the blades may be controlled according to the position of the skids 1, and the position of the skids 1 can be adjusted by means of the teeth 6 and the member 7. For instance, if the cultivator is to be used on real soft, sandy soil, the skids 1 would be caused to assume a position to retain the blades as far out of the soil as possible, whereas, if the soil were only moderately soft, they would be adjusted accordingly and placed in a position as illustrated in Fig. 2, only halfway down. When the soil is such that it makes it unnecessary to employ the skids, they may be placed in an entirely inoperative position, as illustrated in Fig. 1.

By equipping a cultivator with these skids, not only may they be used to advantage when the cultivator is in use, but when it is desired to transfer the implement from one place to another, these skids may be employed as runners, and in this way the cultivator may be taken from place to place without danger of injuring the blades.

Claim:

In a cultivator, a plurality of cultivating blades, a pair of skids mounted on the cultivator for controlling the cutting depth of said blades, a pair of levers on which the skids are mounted, an actuating lever connected to said pair of levers for moving the skids into and out of skidding relation with the soil, and a toothed rack on one end of the actuating lever, adapted to engage a bar on the cultivator for selectively maintaining the skids in a predetermined position.

The foregoing specification signed at St. Elmo, Chattanooga, Tenn., this 22 day of August, 1918.

EDWARD FOWLER.
JOHN V. LEWIS.

In presence of—
A. W. BREHHOLTZ,
RAY MILLER.